United States Patent
Sonenblick et al.

(10) Patent No.: US 10,931,868 B2
(45) Date of Patent: Feb. 23, 2021

(54) METHODS AND APPARATUS FOR INSTANT CAPTURE OF CONTENT

(71) Applicant: GoPro, Inc., San Mateo, CA (US)

(72) Inventors: Andrew David Sonenblick, Carlsbad, CA (US); Ojas Gandhi, Fremont, CA (US); Naveen Chinya Krishnamurthy, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/384,168

(22) Filed: Apr. 15, 2019

(65) Prior Publication Data
US 2020/0329194 A1 Oct. 15, 2020

(51) Int. Cl.
*H04N 5/232* (2006.01)
*G06K 9/78* (2006.01)
*G06K 9/62* (2006.01)

(52) U.S. Cl.
CPC ....... *H04N 5/23222* (2013.01); *G06K 9/6267* (2013.01); *G06K 9/78* (2013.01); *H04N 5/23245* (2013.01); *H04N 5/232411* (2018.08)

(58) Field of Classification Search
CPC ............ H04N 5/23222; H04N 5/23245; G06T 2207/20081; G06T 2207/20084; G06N 3/02–049; G06N 3/08–088; G06N 7/00–08; G06N 20/00–20; G06K 9/00288–0315; G06K 9/00536–00563; G06K 9/00617; G06K 9/00624–00845; G06K 9/6267–6287
See application file for complete search history.

(56) References Cited

U.S. PATENT DOCUMENTS

| | | | | |
|---|---|---|---|---|
| 6,301,440 B1* | 10/2001 | Bolle | ................. | G06K 9/00664 348/229.1 |
| 2010/0079589 A1* | 4/2010 | Yoshida | ................. | H04N 5/232 348/81 |
| 2010/0171846 A1* | 7/2010 | Wood | ................. | H04N 1/00323 348/231.99 |
| 2012/0069141 A1* | 3/2012 | Sim | ...................... | H04N 5/2355 348/36 |
| 2012/0086825 A1* | 4/2012 | Yost | ................... | H04N 5/23222 348/216.1 |
| 2015/0189167 A1* | 7/2015 | Gwak | ................ | H04N 5/23222 348/222.1 |

(Continued)

*Primary Examiner* — Paul M Berardesca
(74) *Attorney, Agent, or Firm* — Young Basile Hanlon & MacFarlane, P.C.

(57) ABSTRACT

Methods and apparatus for instant capture of content are described. A method may include placing an image capture device in an aware state and capturing aware state data. The aware state may include enabling low power sensors or entering the image capture into an event mode. A content capture opportunity is automatically determined from the captured aware state data. The aware state data may be image information and a classifier classifies the image information. The aware state data may be position data for the image capture device and when the image capture device is in a capture position, the image capture device may instantly capture image information. An image capture device mode is automatically selected for the content capture opportunity and content is automatically captured with the selected image capture device mode.

12 Claims, 12 Drawing Sheets

(56) References Cited

U.S. PATENT DOCUMENTS

2015/0244943 A1* 8/2015 Brown .................... G06F 16/51
                                                    348/571
2017/0054899 A1* 2/2017 Sadhwani .......... H04N 5/23245
2017/0094171 A1* 3/2017 Lim ................... G06K 9/00664

* cited by examiner

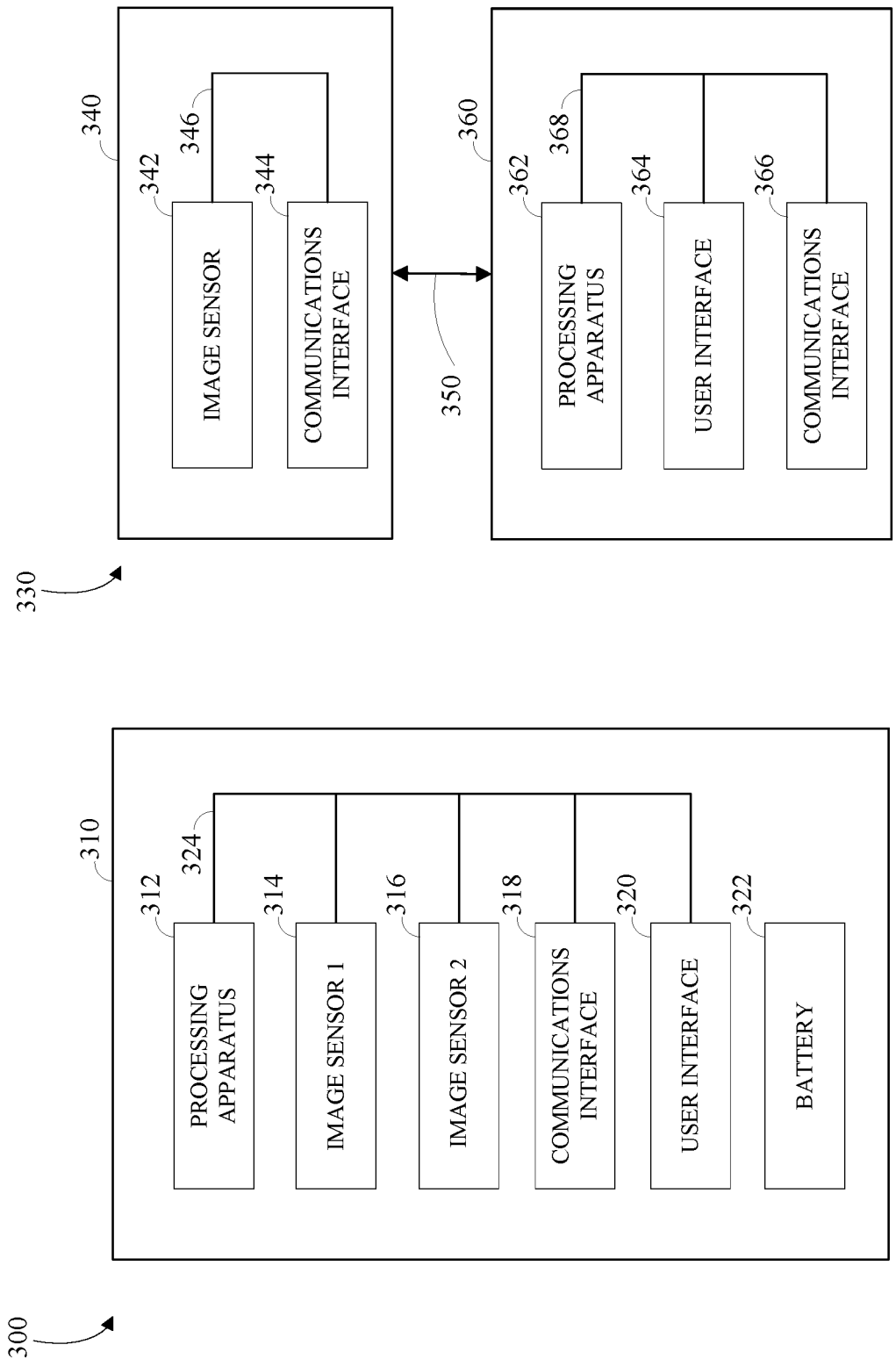

METHODS AND APPARATUS FOR INSTANT CAPTURE OF CONTENT

TECHNICAL FIELD

This disclosure relates to image capture devices and instant capture of content using the image capture devices.

BACKGROUND

Image capture devices may capture content including image data, video data, audio data, and the like. Increasingly, consumers are looking for image capture devices that are expansively versatile. Consumers want image capture devices that can capture moments that were traditionally not convenient for photography and/or videography. As such, image capture devices are being designed to be worn or mounted to the body or equipment. In this way, users can use their image capture devices to capture activities such as snowboarding, skiing, scuba diving, parachuting, kayaking, cliff jumping, motor-biking, and the like. However, users have to pick up, turn on, and adjust the image capture device to the activity and environment before content can be captured. By the time the user has completed these actions, the moment the user wants to capture is over. This leaves the user disappointed at having missed the moment. Users should not have to worry about the image camera device while enjoying the moment.

SUMMARY

Disclosed herein are implementations of methods and apparatus for instant capture of content. A method may include placing an image capture device in an aware state and capturing aware state data. A content capture opportunity is automatically determined from the captured aware state data. An image capture device mode is automatically selected for the content capture opportunity and content is automatically captured with the selected image capture device mode.

In an implementation, an image capture device includes an aware device which captures aware data. An opportunity processor automatically determines a content capture opportunity by processing the captured aware data. A processor, for a determined content capture opportunity, automatically selects an image capture device mode based on the processed captured aware data. An image sensor and optical component instantly captures image information using the selected image capture device mode.

In an implementation, the aware device is enabled for at least one of a defined period and an event mode. In an implementation, the aware device is a low power, low-resolution image sensor which captures low-resolution image information and the aware data is the low-resolution image information and the opportunity processor is a classifier which classifies the low-resolution image information. In an implementation, the classifier may be at least one of a computer vision engine and a neural network device. In an implementation, the classifier may classify the image information and the processor further may automatically update the image capture device mode based on the classified image information.

In an implementation, the aware device is one or more audio components which may capture audio data, the aware data is the audio data, and the opportunity processor is a classifier configured to classify the audio data. The processor, for the determined content capture opportunity, may enable the image sensor and optical component to capture the image information, the classifier may classify the image information, and the processor may automatically select an image capture device mode based on at least one of the classified captured aware data and the classified image information. In an implementation, the classifier may classify the image information using a computer vision engine and a neural network device and the processor further may automatically update the image capture device mode based on further classified image information.

In an implementation, the aware device and the opportunity processor is a position sensor. The position sensor may obtain image capture device position data when in an event mode, the aware data is the image capture device position data, and the position sensor mat determine the content capture opportunity by determining when the image capture device is in at least a potential content capture position using the image capture device position data. The processor, for the determined content capture opportunity, may enable the image sensor and optical component to capture the image information and automatically select an image capture device mode based on at least one of the processed captured aware data and classified image information. In an implementation, the classifier further may classify the image information using at least one of a computer vision engine and a neural network device. In an implementation, the processor may automatically update the image capture device mode based on further classified image information and may automatically stop capturing the image information based on at least one of additional processed captured aware data and additional classified image information.

In an implementation, a method for instantly capturing image information includes placing an image capture device in an aware state, automatically capturing aware state data, automatically determining whether a content capture opportunity exists based on the captured aware state data, automatically selecting an image capture device mode for a positive content capture opportunity, and automatically capturing content with the selected image capture device mode. In an implementation, low power content capture devices are enabled when in the aware state. In an implementation, a low power content capture device may be a low power, low-resolution image sensor which captures low-resolution image information and the aware state data is the low-resolution image information. In an implementation, the automatically determining includes automatically classifying the low-resolution image information using at least one of a computer vision engine and a neural network device and automatically selecting the image capture device mode based on the classified image information. In an implementation, the method further includes automatically updating the image capture device mode based on further classified image information and stopping capturing image information based on at least one of additional processed captured aware state data and additional classified image information.

In an implementation, the image capture device is in an event mode when in the aware state. A position sensor is enabled to obtain measurement data for the image capture device and the aware state data is the measurement data. The automatically determining further includes automatically determining when the image capture device is approaching a content capture position using the measurement data, automatically capturing the image information when the approach is near or at the content capture position, automatically classifying the captured image information, and automatically selecting the image capture device mode based on the classified image information. In an implementation, the method includes automatically updating the image capture device mode based on further classified image information and automatically stopping capturing image information based on at least one of additional processed captured aware state data and additional classified image information.

In an implementation, a method for instantly capturing image information includes setting an image capture device in an event mode, automatically obtaining position data for the image capture device, automatically determining whether the image capture device is in a content capture position based on the obtained position data, automatically capturing image information when the image capture device is near or in the content capture position, automatically selecting an image capture device mode for the captured image information, and automatically capturing image information with the selected image capture device mode. In an implementation, the method includes automatically classifying the captured image information. In an implementation, the method includes automatically updating the image capture device mode based on further classified image information. In an implementation, the method includes automatically stopping capturing image information based on at least position data. In an implementation, the method includes automatically stopping capturing image information based on at least classified image information.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
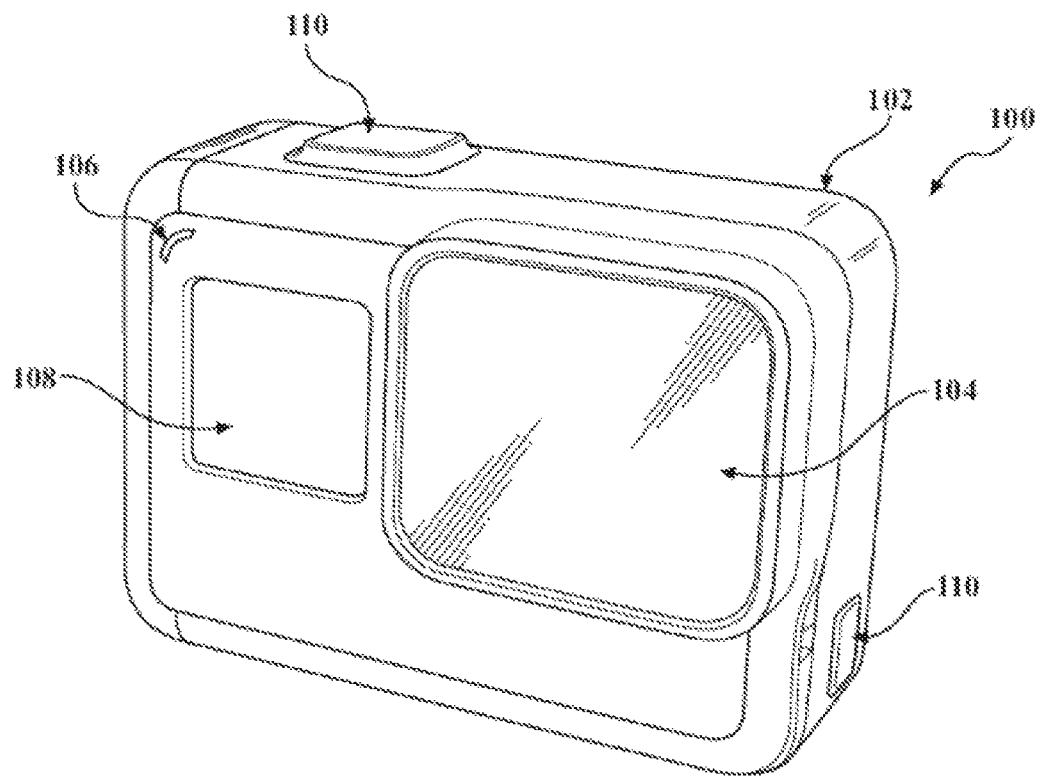
FIGS. 1A-D are isometric views of an example of an image capture device.

Disclosed herein are implementations of methods and apparatus for instant capture of content using image capture devices. An image capture device may include a variety of mechanisms and techniques which may allow the image capture device to automatically and instantly capture content based on image capture device movement, scene and/or object detection, audio detection and the like. In an implementation, the image capture device may use a low power, low resolution image sensor coupled with vision computing, neural network devices and position sensors to determine if a content capturing event may exist. In an implementation, to conserve battery power, the image capture device may periodically perform a scene and/or object determination using the low power, low resolution image. Upon content capture activation, the image capture device may determine and select an image capture device mode which fits the content. In an implementation, the image capture device may select from photo mode, video mode, timelapse mode, timewarp mode, burst mode and the like based on scene and/or activity determination. In an implementation, the image capture device may stop capturing content based on user action, audio signal, scene and/or object determination, time period and the like.

In an implementation, an image capture device may be set to an event mode when a user is headed to an event or activity at which they wish to record content. This event mode places the image capture device in a low power usage mode. For example, the screen may be off to save battery power. In an implementation, when the user raises the image capture device to a content capture position, the image capture device may automatically and instantly begin capturing content without the user having to press anything and without the camera having to prepare to capture. In an implementation, whether the image capture device is in the content capture position may be based on data provided by a position sensor, such as for example an inertial measurement unit (IMU). In an implementation, content capture may be started when the image capture device has determined that there is a fair likelihood or probability that the image capture device will soon be in the content capture position. This increases the likelihood of capturing the content associated with the event or moment instead of potentially missing the content. In an implementation, content capture may be stopped based on user input or image capture device determination.

In an implementation, an image capture device may include image sensors, optical components, and audio components for collectively capturing image information and sounds (which may be referred to herein as content as appropriate). The image capture device may further include some combination of a computer vision engine, a neural network device or neural engine, a low power, low resolution image processor, a position sensor, and a processor which may collectively determine from the captured image information and sounds when to start content capture and how to capture the content. For example, machine learning techniques may be applied to the image information and sounds to determine a content capture opportunity. The image capture device may be in an aware state and automatically start capturing content based on the determination. In an implementation, the image capture device may be wearable.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
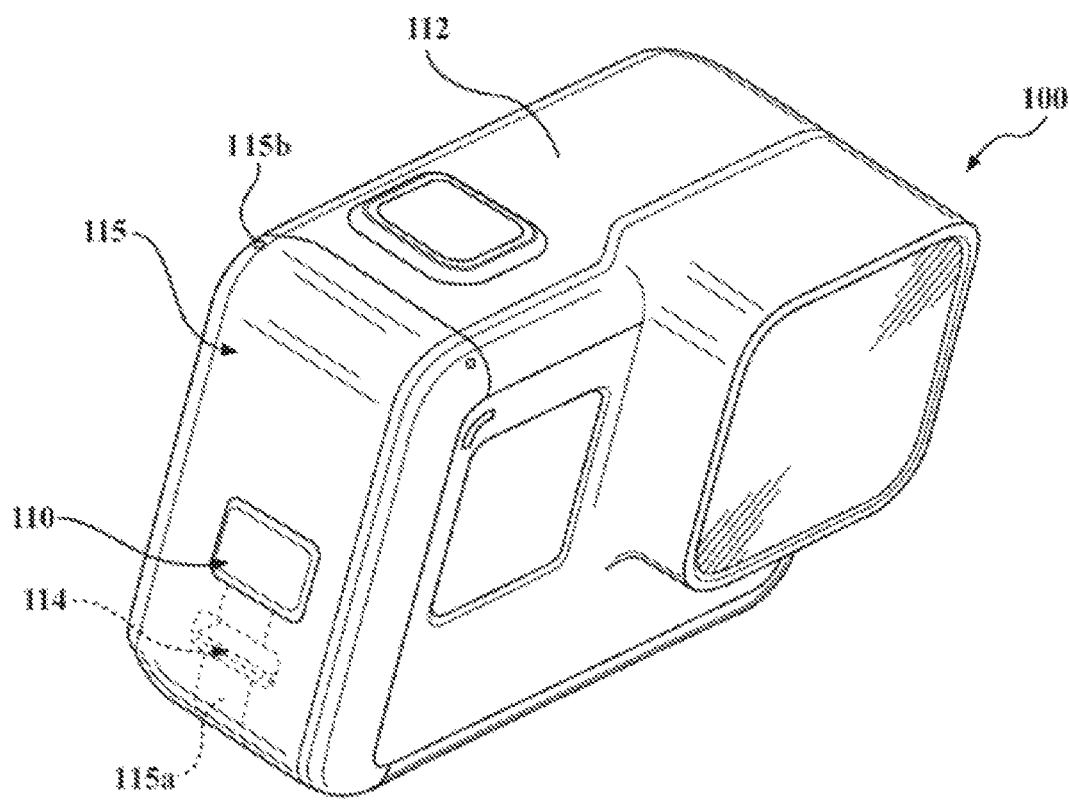
Figure 1C:
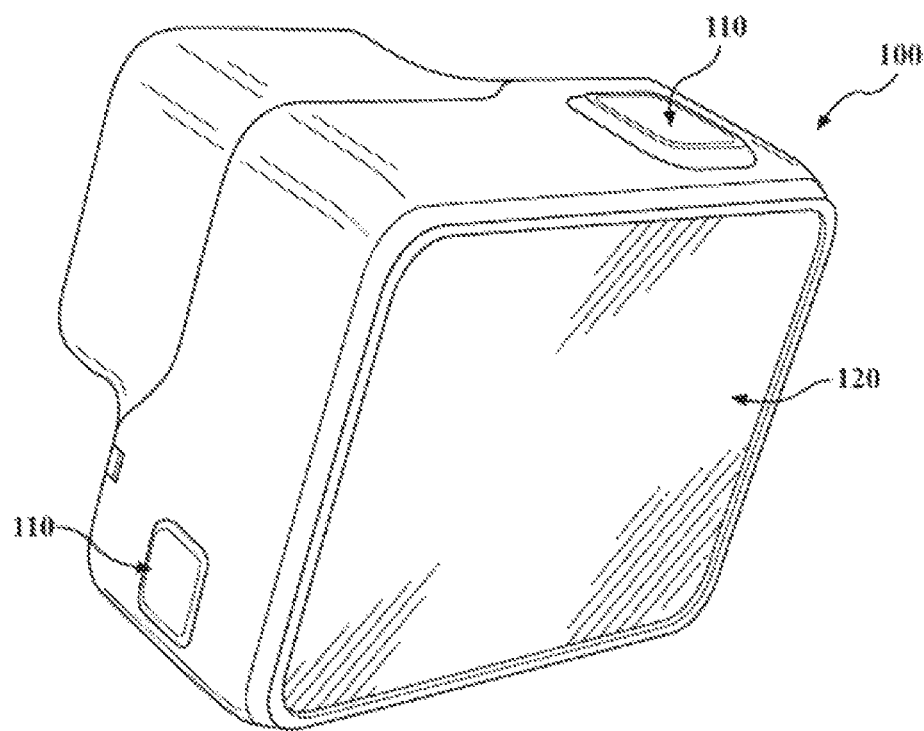
Figure 1D:
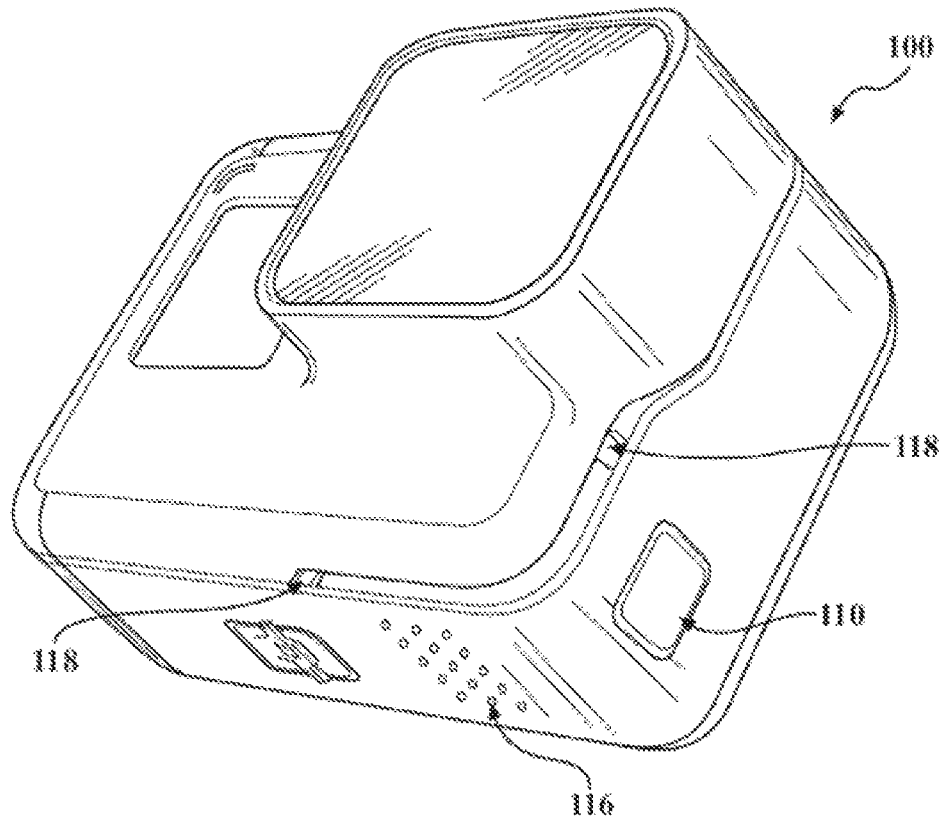

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a tablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 5:
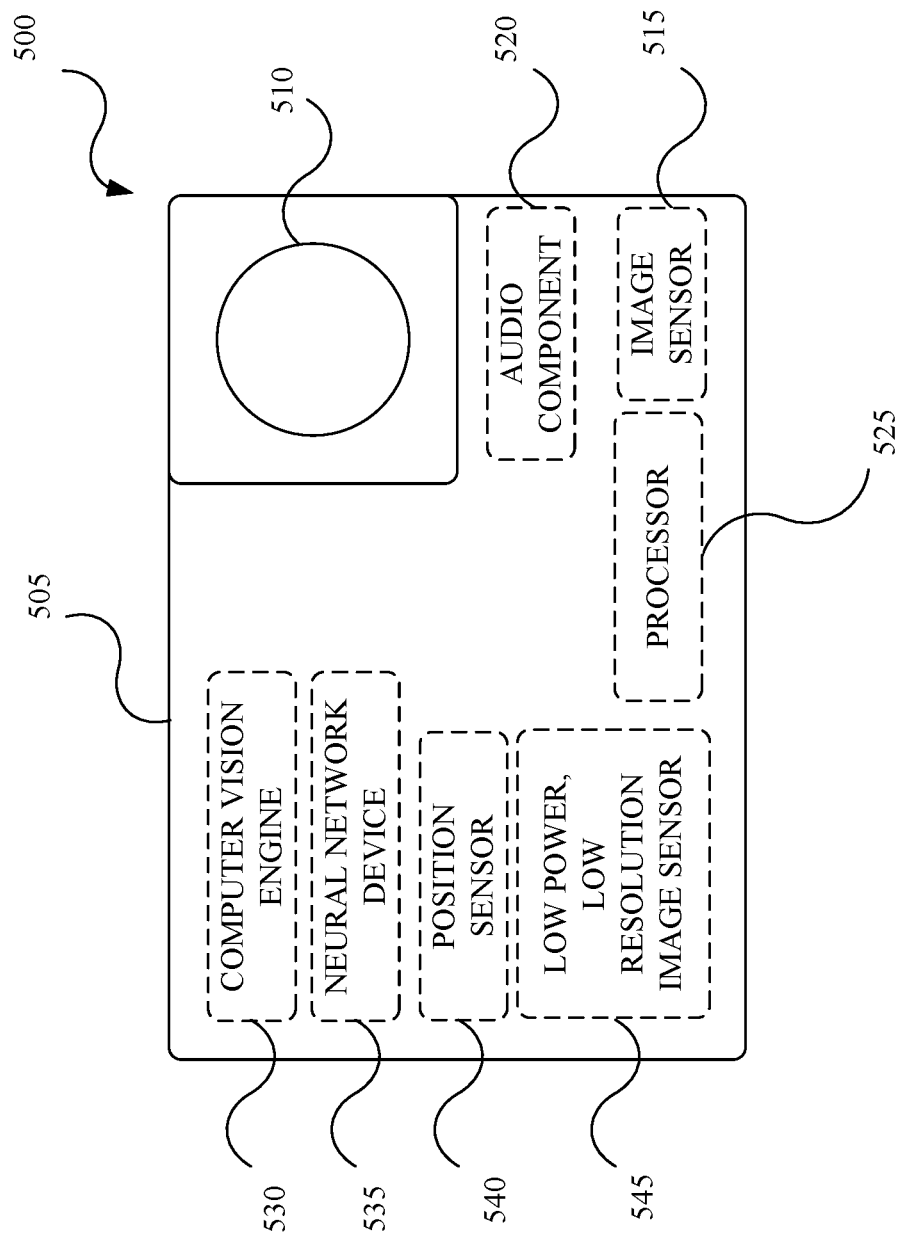
FIG. 5 is a diagram of an example image capture device for instant capture of content in accordance with embodiments of this disclosure.
Figure 6:
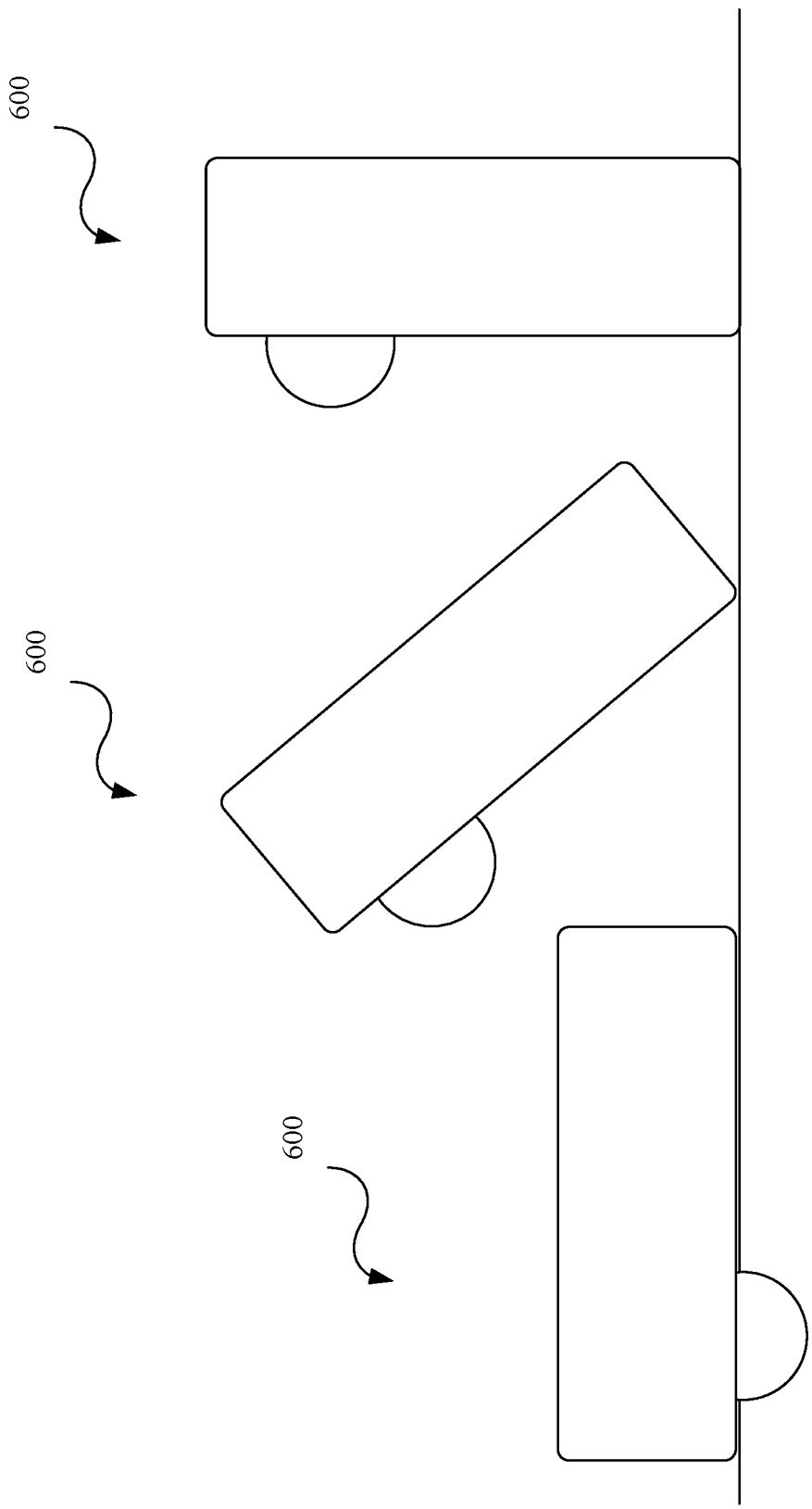
FIGS. 6A-C are diagrams of an example image capture device progressing from an example non-capture position, example potential content capture position, and an example content capture position.
Figure 7:
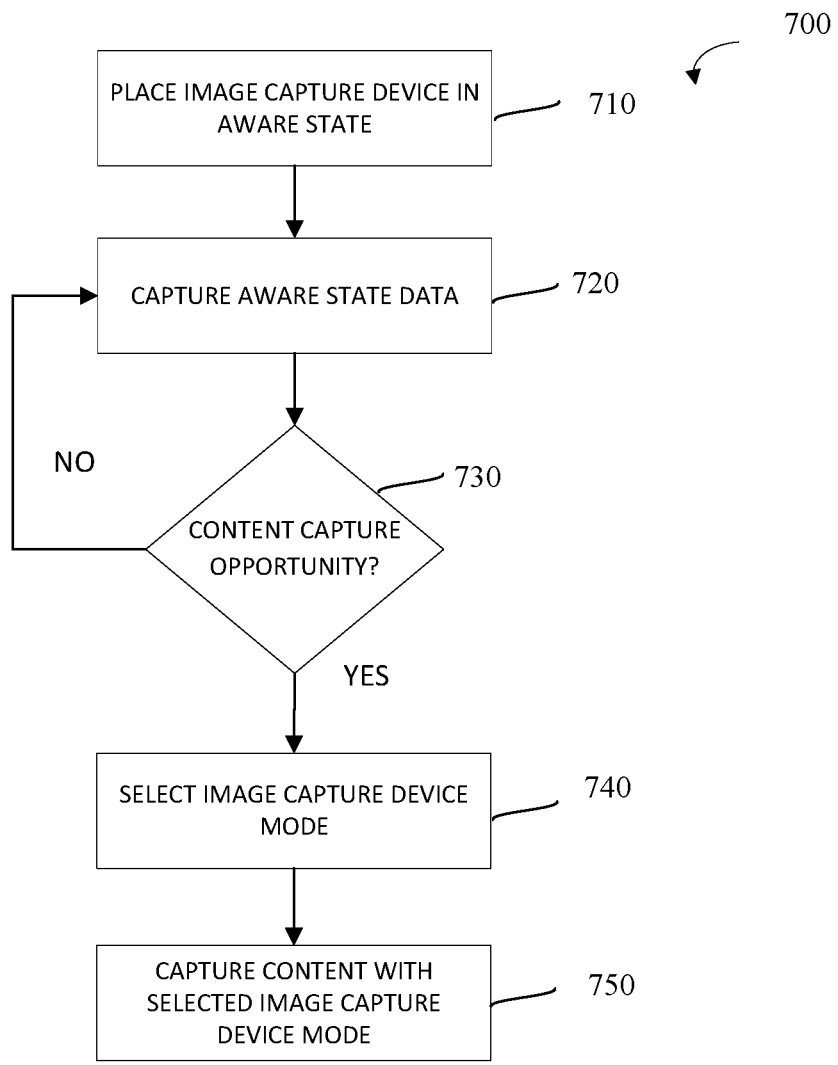
FIG. 7 is flowchart of an example of a process for instant capture of content in accordance with embodiments of this disclosure.
Figure 8:
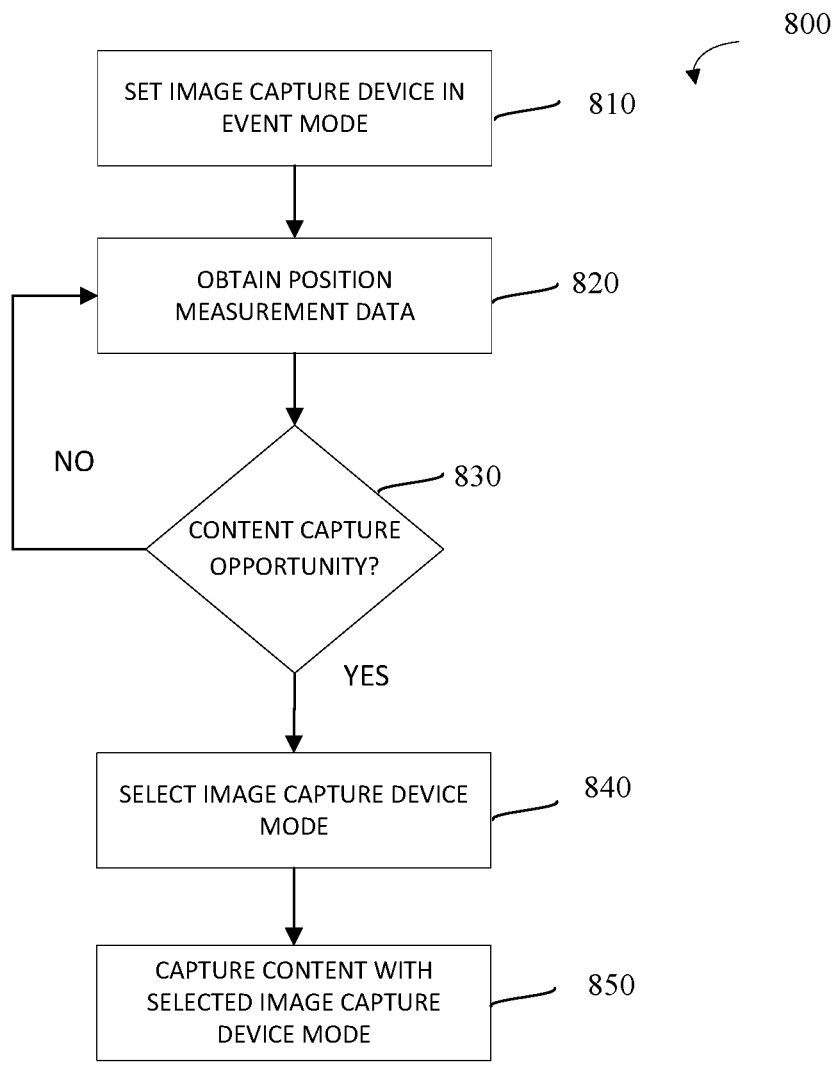
FIG. 8 is flowchart of an example of a process for instant capture of content in accordance with embodiments of this disclosure.
Figure 9:
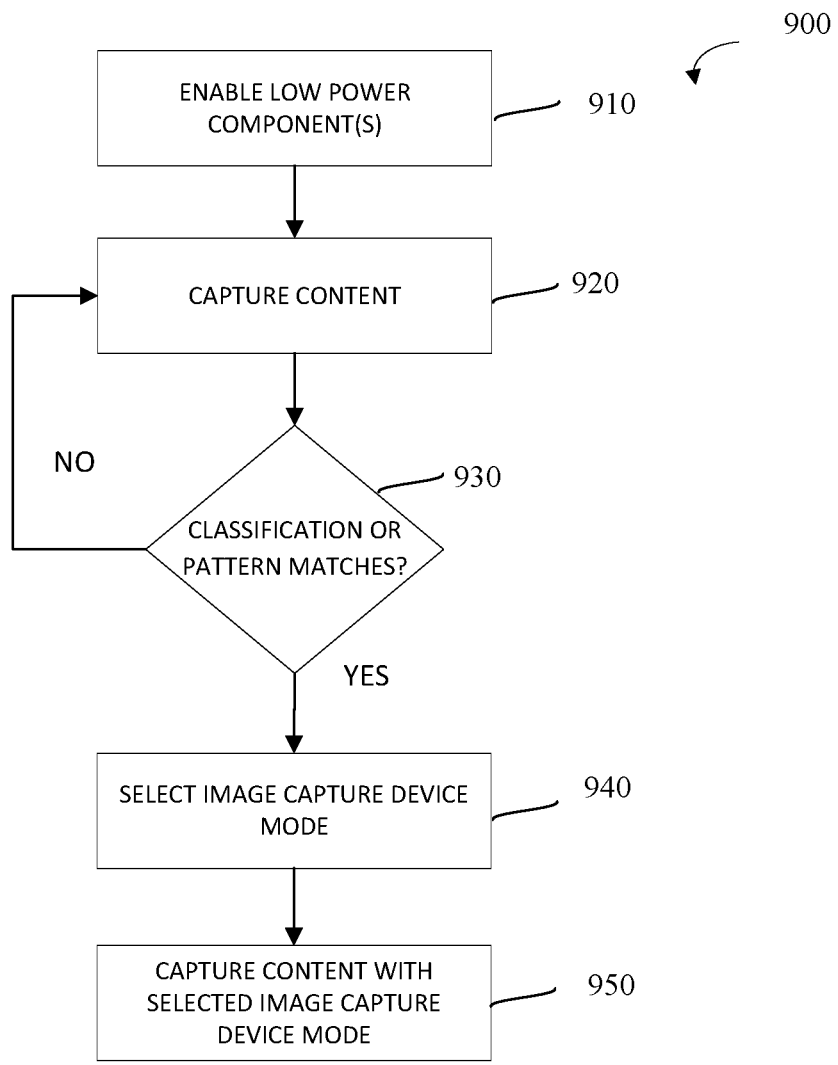
FIG. 9 is flowchart of an example of a process for instant capture of content in accordance with embodiments of this disclosure.

The image capture device 100 may include the implementations described in this disclosure, such as the embodiments and implementations described in FIGS. 5-6C and may be used to implement some or all of the techniques described in this disclosure, such as the techniques described in FIGS. 7-9.

Figure 2A:
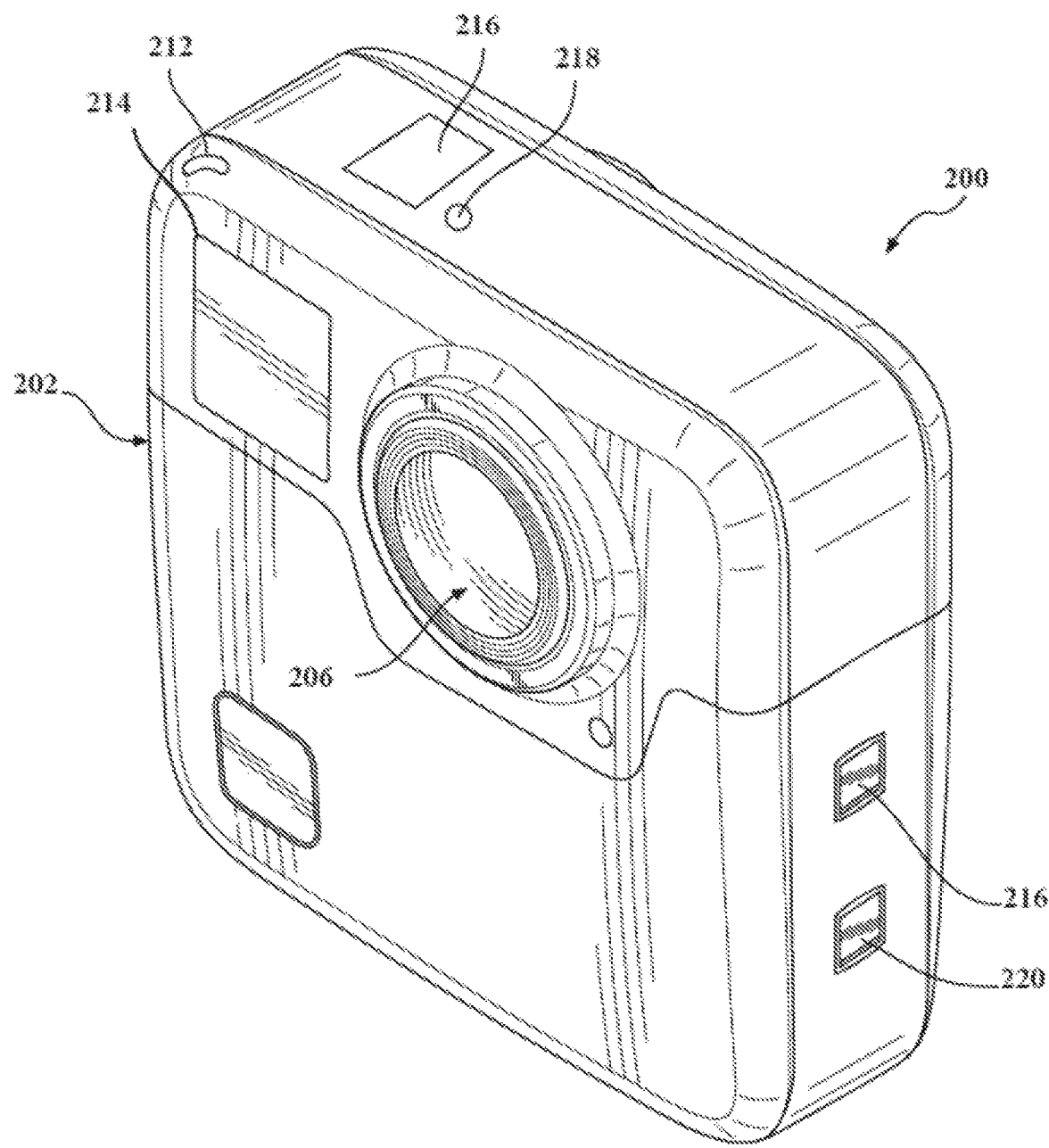
FIGS. 2A-B are isometric views of another example of an image capture device.
Figure 2B:
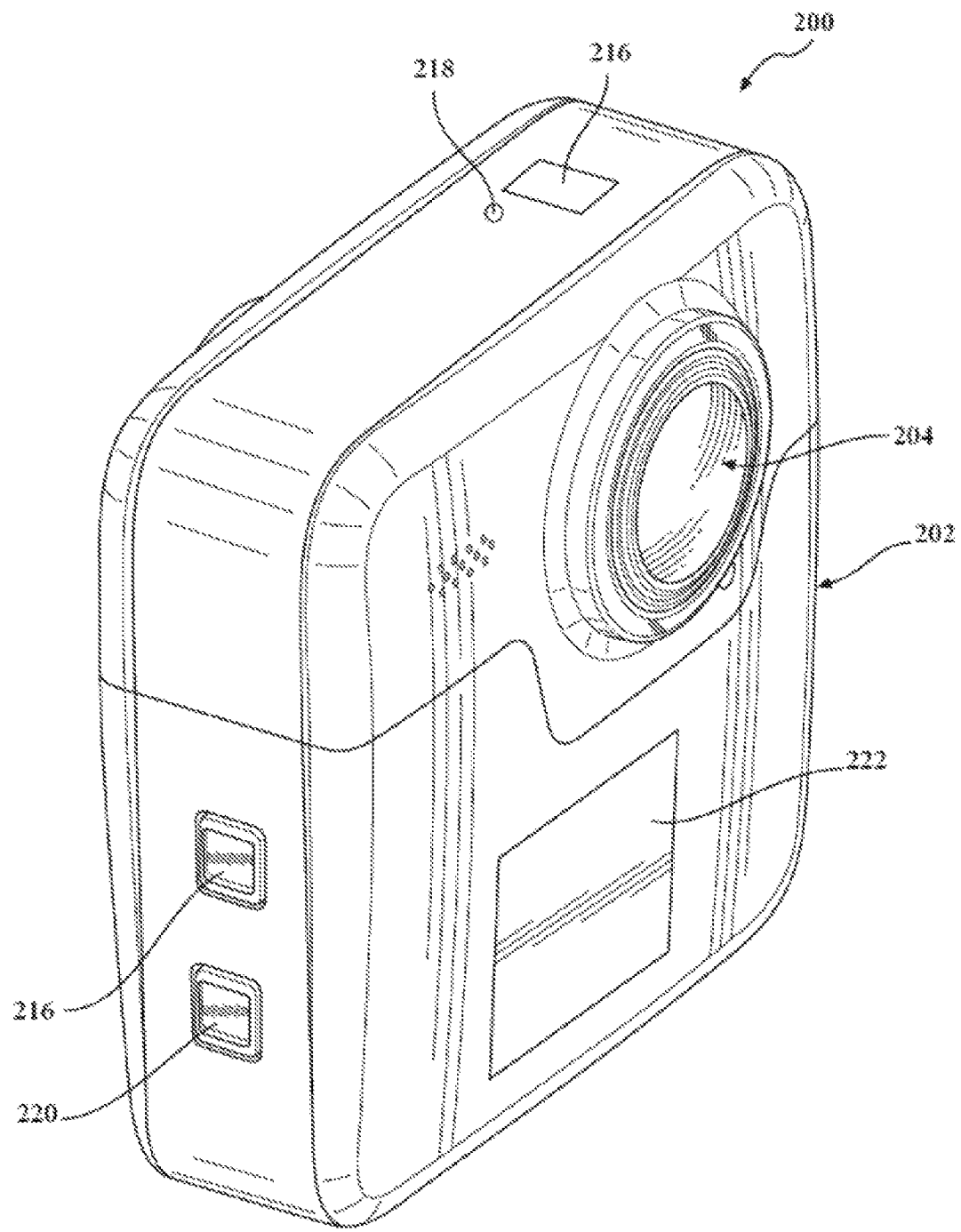

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
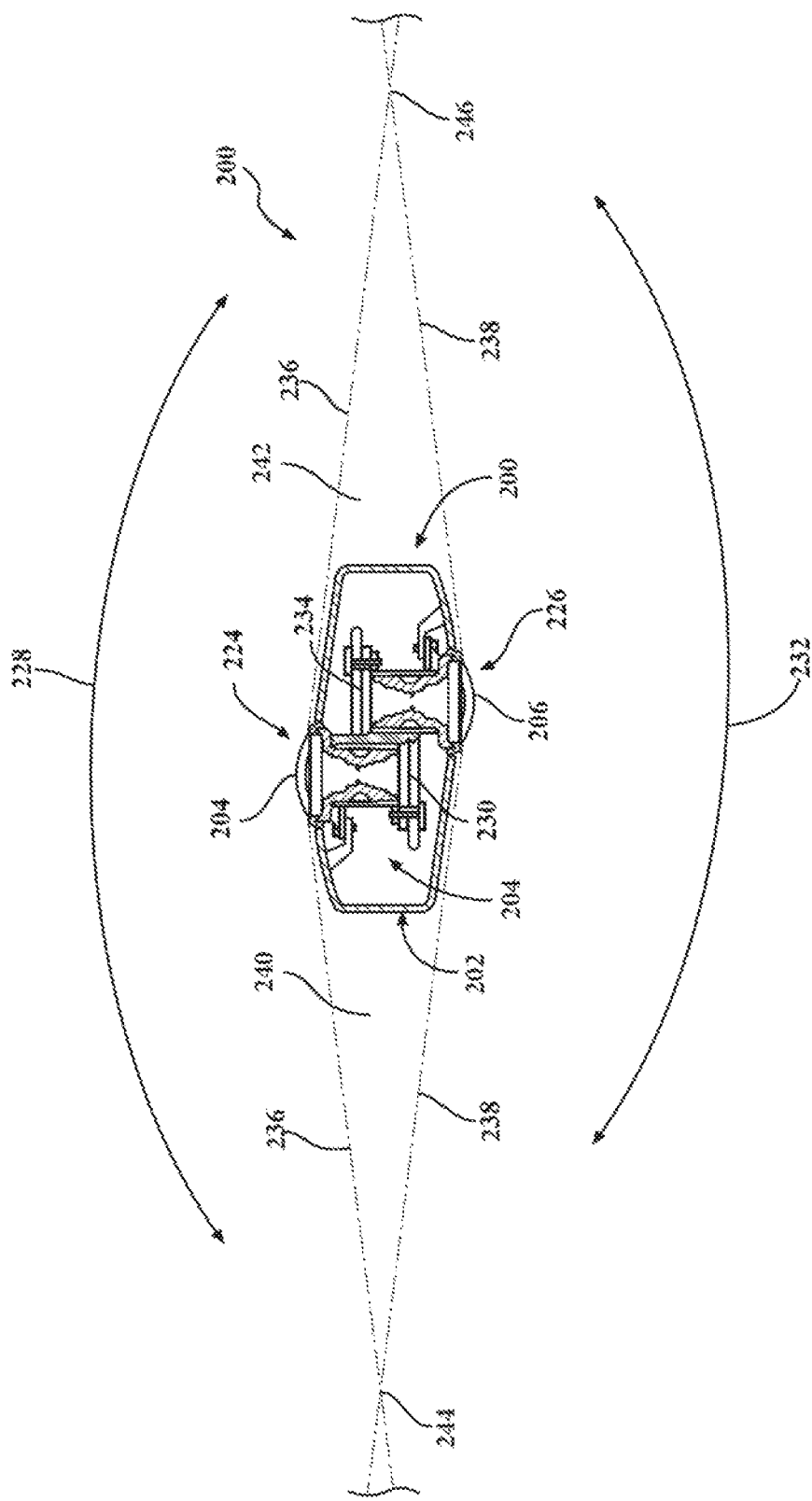
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

The image capture system 200 may include the implementations described in this disclosure, such as the embodiments and implementations described in FIGS. 5-6C and may be used to implement some or all of the techniques described in this disclosure, such as the techniques described in FIGS. 7-9.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may include the implementations described in this disclosure, such as the embodiments and implementations described in FIGS. 5-6A and may be used to implement some or all of the techniques described in this disclosure, such as the techniques described in FIGS. 7-9.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may include the implementations described in this disclosure, such as the embodiments and implementations described in FIGS. 5-6C and may be used to implement some or all of the techniques described in this disclosure, such as the techniques described in FIGS. 7-9.

Figure 4B:
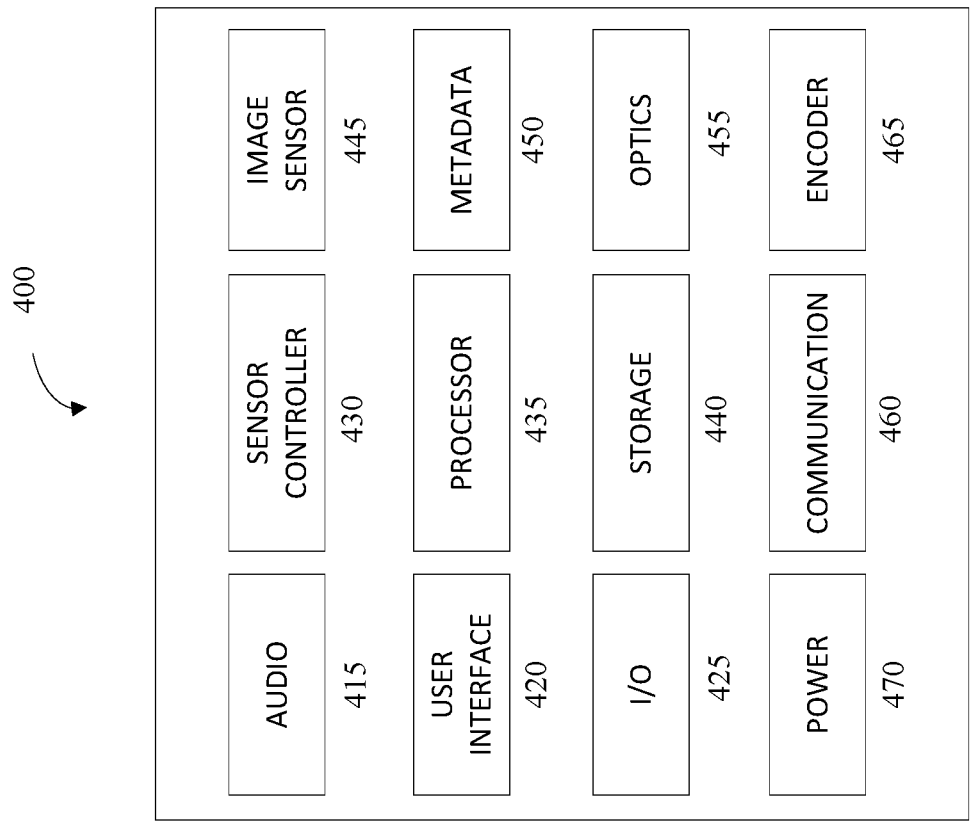
FIGS. 4A-B are a perspective view and a schematic representation of an image capture device.
Figure 4A:
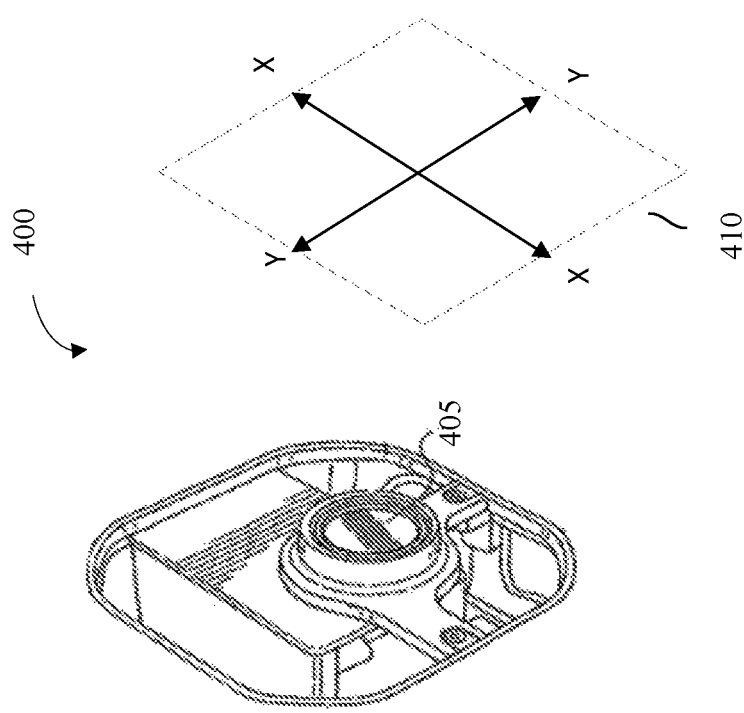

FIG. 4A is a perspective view of another example of an image capture device 400 together with an associated field-of-view and FIG. 4B is a schematic representation of the image capture device 400. The image capture device 400 includes one or more optical components or elements 405 with an associated field-of-view 410 that extends, for example, 90° in a lateral dimension X-X and 120° in a longitudinal dimension Y-Y. Dependent upon the capabilities of the particular optical component(s) 405, however, the extent of the field-of-view 410 may be varied (i.e., increased or decreased) in the lateral dimension or the longitudinal dimension. Suitable optical component(s) 405 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, spherical lenses, and perspective control lenses. In some image capture devices, multiple, overlapping fields of view are employed to increase the capability of the device, for example, by including two or more optical elements. For example, a first fisheye image may be a round or elliptical image, and may be transformed into a first rectangular image; a second fisheye image may be a round or elliptical image, and may be transformed into a second rectangular image; and the first and second rectangular images may be arranged side-by-side, which may include overlapping, and stitched together to form the equirectangular planar image.

As seen in FIG. 4 in addition to the optical component(s) 405, the image capture device 400 may further include an audio component 415, a user interface (UI) unit 420, an input/output (I/O) unit 425, a sensor controller 430, a processor 435, an electronic storage unit 440, an image sensor 445, a metadata unit 450, an optics unit 455, a communication unit 460, an encoder 465, and power system 470. Suitable examples of the image sensor 445 may include a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

During the processing of images, it is envisioned that the processor 435 may identify motion information, such as motion vectors, representing motion between the respective images and reference data. For example, the processor 435 may perform motion estimation to generate the motion information. The processor 435 may then output the processed images, for example, to a memory of the image capture device 400 for storage.

The image capture device 400 may include the implementations described in this disclosure, such as the embodiments and implementations described in FIGS. 5-6C and may be used to implement some or all of the techniques described in this disclosure, such as the techniques described in FIGS. 7-9.

FIG. 5 is a diagram of an image capture device 500 including a body 505, one or more optical components 510 structured on the body 505, one or more image sensors 515 internal to the body 505, one or more audio components 520 internal to and structured on the body 505, and a processor 525 internal to the body 505. In an implementation, the one or more optical components 510 and the one or more image sensors 515 are fixed with respect to the image capture device 500. The image capture device 500 may include one or more of a computer vision engine 530 internal to the body 505, a neural engine or neural network device 535 internal to the body 505, a position sensor 540 internal to the body 505, and/or a low power, low resolution image sensor 545 internal to the body 505. The image capture device 500 may include any or all features and/or characteristics described with respect to FIGS. 1-4. Although shown as a single element, in alternate embodiments, the number of each element may be varied without departing from the scope of the present disclosure.

The one or more optical components 510 may include any or all features and/or characteristics described with respect to FIGS. 1-4. For example, the one or more optical components 510 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, perspective control lenses, and/or any other lens(es) and/or combinations thereof.

The one or more image sensors 515 may include any or all features and/or characteristics described with respect to FIGS. 1-4. For example, one or more image sensors 515 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

The one or more audio components 520 may include any or all features and/or characteristics described with respect to FIGS. 1-4. For example, the one or more audio components 520 may include one or more microphones which may receive, sample, capture, and/or record audio data, such as sound waves which may be related to image or video data, and/or may be audio cues or commands for initiating content capture as described herein. For example, the audio data, cues, or commands may be associated with a virtual assistant system, voice-activated system or voice-enabled system. In an implementation, the image capture device 500 may be in an aware state where the audio components 520 may capture audio data for determining whether to initiate content capture as described herein. The audio data or signals therefrom may be provided to other elements in the image capture device 500 including, but not limited to, the processor 525 and the neural network device 535.

The processor 525 may include any or all features and/or characteristics described with respect to FIGS. 1-4 and may be a system-on-chip, image signal processor, a controller or combinations thereof. The processor 525 may collectively work with the optical components 510, the image sensors 515, the audio components 520, the computer vision engine 530, the neural engine 535, the position sensor 540, the low power, low resolution image sensor 545 and/or combinations thereof, as appropriate, to automatically and instantly capture content based on movement of the image capture device, scene and/or object detection or classification, audio signals, and/or combinations thereof.

The computer vision engine 530 may process, analyze, and understand the image data or information, and extract information to make or assist in making decisions regarding the image data. In an example, the computer vision engine 530 may determine scene classification, object classification, environment, or combinations thereof from a scene as a basis for initiating content capture, selecting content capture mode, or combinations thereof. In an implementation, the computer vision engine 530 may be implemented in hardware, software, firmware, combinations thereof, or the like. In an implementation, the computer vision engine 530 may be implemented as a standalone processor, an ASIC, a field-programmable gate array (FPGA), combinations thereof, or the like. In an implementation, the computer vision engine 530 may be implemented using the processor 525. The computer vision engine 530 information may be provided to other elements in the image capture device 500 including, but not limited to, the processor 525 and the neural network device 535.

The neural network device 535 may analyze and determine patterns from the image data or information to make or assist in making decisions regarding the image data. In an example, the neural network device 535 may determine scene patterns, object patterns, environment, or combinations thereof from a scene as a basis for initiating content capture, selecting content capture mode, or combinations thereof. In an implementation, the neural network device 535 may be a deep neural network (DNN), a convolutional neural network (CNN), and the like which learns and recognizes scenes and activities based on previously captured content. The neural network device 535 may be implemented in hardware, software, firmware, combinations thereof, or the like. In an implementation, the neural network device 535 may be implemented as a standalone processor, an ASIC, a field-programmable gate array (FPGA), combinations thereof, or the like. In an implementation, the neural network device 535 may be implemented using the processor 525. The neural network device 535 information may be provided to other elements in the image capture device 500 including, but not limited to, the processor 525. In an implementation, the computer vision engine 530 and the neural network device 535 maybe referred to as a classifier.

The position sensor 540 may include any type of device suitable for determining a position associated with the image capture device 500. In an implementation, the position sensor 540 may be an inertial measurement unit (IMU) device, an accelerometer, a gyro, combinations thereof, or the like. Position data, information, or measurements from the position sensor 3030 may be made available to different elements in the image capture device 500 including, but not limited to, the processor 525, the neural network device 535 and the like.

The low power, low resolution image sensor 545 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors. In an implementation, the image capture device 500 may be in an aware state where the low power, low resolution image sensor 545 is capturing image data for determining whether to initiate content capture as described herein. In an implementation, the low power, low resolution image sensor 545 may capture image data on a periodic basis or interval. In an implementation, the low power, low resolution image sensor 545 may capture image data when the image capture device is the event mode. In an implementation, the image sensor 515 may have a low power, low resolution mode and therefore function as the low power, low resolution image sensor 545.

In an implementation, the processor 525 may automatically and instantly capture content with the image capture device 500 when the computer vision engine 530 and neural network device 535 determine a content capture opportunity from low-resolution image information captured by the low power, low resolution image sensor 545. In an implementation, the image capture device 500 may be in an aware state where the low power, low resolution image sensor 545 is actively capturing low-resolution image information. In an implementation, the low power, low resolution image sensor 545 may be capturing low-resolution image information on a periodic basis. In an implementation, the image capture device 500 may be in the aware state due to event mode selection by a user. The content capture opportunity may be based on, but is not limited to, scene classification, object classification, scene pattern, object pattern, and the like. For example, an analysis of the low-resolution image information may determine a birthday party, a party, surfing activity, ski jumping activity, a ceremony and the like. In an implementation, the processor 525 may select an image capture device mode based on the determination of the low-resolution image information, image information from the image sensor 515, or combinations thereof. In an implementation, the image capture device 500 may stop capturing content based on user action, audio signal, image capture device position, scene and/or object determination, defined period, time period, event based, and the like.

In an implementation, the processor 525 may automatically and instantly capture content with the image capture device 500 when position data or measurements from the position sensor 540 indicate that the image capture device 500 is in a content capture position or about to be in a content capture position. FIGS. 6A-C are diagrams of an example image capture device 600 progressing from an example non-capture position in FIG. 6A, example potential content capture position in FIG. 6B, and an example content capture position in FIG. 6C. In an implementation, the image capture device 500 may be in the aware state due to event mode selection by a user. In an implementation, the image capture device 500 may be in an aware state where the low power, low resolution image sensor 545 is actively capturing low-resolution image information. In an implementation, the low power, low resolution image sensor 545 may be capturing low-resolution image information on a periodic basis. In an implementation, the processor 525 may select an image capture device mode based on a determination of low-resolution image information, image information from the image sensor 515, or combinations thereof. For example, an analysis of the low-resolution image information or the image information may determine a birthday party, a party, surfing activity, ski jumping activity, a ceremony and the like. In an implementation, the computer vision engine 530 and neural network device 535 may make a determination based on, but not limited to, scene classification, object classification, scene pattern, object pattern, and the like. In an implementation, the image capture device 500 may stop capturing content based on user action, audio signal, image capture device position, scene and/or object determination, defined period, time period, event based, and the like.

In an implementation, the processor 525 may automatically and instantly capture content with the image capture device 500 when the neural network device 535 determines a content capture opportunity from audio data, signals, or commands received by the audio component 520. In an implementation, the image capture device 500 may be in an aware state where the audio component 520 is actively capturing audio data, signals, or commands. In an implementation, the audio component 520 may be capturing audio data, signals, or commands on a periodic basis. In an implementation, the image capture device 500 may be in the aware state due to event mode selection by a user. A content capture opportunity may be based on, but is not limited to, sound classification, command recognition, and the like. For example, an analysis of the audio data, signal, or command may determine a birthday party based on the audio matching a rendition of a happy birthday song. In an implementation, the processor 525 may select an image capture device mode based on a determination of low-resolution image information from the low power, low-resolution image sensor 545, image information from the image sensor 515, or combinations thereof. For example, an analysis of the low-resolution image information or the image information may determine a birthday party, a party, surfing activity, ski jumping activity, a ceremony, and the like. In an implementation, the computer vision engine 530 and neural network device 535 may determine based on, but not limited to, scene classification, object classification, scene pattern, object pattern, and the like. In an implementation, the image capture device 500 may stop capturing content based on user action, audio signal, image capture device position, scene and/or object determination, defined period, time period, event based, and the like.

In an implementation, the processor 525 may automatically and instantly capture content with the image capture device 500 based on determinations by one or more of the computer vision engine 530, the neural network device 535, and the position sensor 540 from one or more of low-resolution image information captured by the low power, low resolution image sensor 545, position data captured by the position sensor 540, or audio data, signals, or commands captured by the audio component 520. In an implementation, the image capture device 500 may be in an aware state where the low power, low resolution image sensor 545 is actively capturing low-resolution image information, the audio component 520 is actively capturing audio data, signals, or commands, or combinations thereof. In an implementation, the low power, low resolution image sensor 545 may be capturing low-resolution image information on a periodic basis, the audio component 520 may be capturing audio data, signals, or commands on a periodic basis, or combinations thereof. In an implementation, the image capture device 500 may be in the aware state due to event mode selection by a user. A content capture opportunity may be based on, but is not limited to, sound classification, command recognition, scene classification, object classification, scene pattern, object pattern, and the like. For example, an analysis of the low-resolution image information may determine a birthday party, a party, surfing activity, ski jumping activity, a ceremony, and the like. In an implementation, the processor 525 may select an image capture device mode based on the determination of the low-resolution image information from the low power, low resolution image sensor 545, image information from the image sensor 515, or combinations thereof. In an implementation, the image capture device 500 may stop capturing content based on user action, audio signal, image capture device position, scene and/or object determination, defined period, time period, event based, and the like.

In an implementation, the computer vision engine 530, the neural network device 535, or a combination thereof may be referred to as a classifier which performs the functionality as described herein. In an implementation, the position sensor 540 and the classifier may be referred to as an opportunity processor or sensor which performs the functionality as described herein. In an implementation, the position sensor 540, the low power, low-resolution image sensor 545, the one or more audio components 520 may be referred to as aware devices which perform the functionality as described herein.

FIG. 7 is flowchart of an example method 700 for instantly capturing content in accordance with embodiments of this disclosure. The method 700 includes: placing 710 an image capture device in an aware state; capturing 720 aware state data or aware data; automatically determining 730 a content capture opportunity from the captured aware state data; automatically selecting 740 an image capture device mode for the content capture opportunity; and automatically capturing 750 content with the selected image capture device mode. The method may be implemented in any of the image capture devices described in FIGS. 1-6A-C.

The method 700 includes placing 710 an image capture device in an aware state. In an implementation, a low power, low-resolution image sensor may be turned on. In an implementation, a low power, low-resolution image sensor may be periodically turned on. In an implementation, an audio component may be turned on. In an implementation, an audio component may be periodically turned on. In an implementation, a position sensor may be turned on. In an implementation, a position sensor may be periodically turned on. In an implementation, one or more of the low power, low-resolution image sensor, the audio component, or the position sensor may be turned on. In an implementation, one or more of the low power, low-resolution image sensor, the audio component, or the position sensor may be periodically turned on. In an implementation, an event mode may be selected for the image capture device. In the event mode, one or more of the low power, low-resolution image sensor, the audio component, or the position sensor may be turned on. In an implementation, the image capture device may be in an aware state for a defined period. In an implementation, the defined period may be time based, an event, or a combination thereof.

The method 700 includes capturing 720 aware state data or aware data. In an implementation, the aware state data is low power, low-resolution image information. In an implementation, the aware state data is audio data, signals, or commands. In an implementation, the aware state data is position data or measurements. In an implementation, the aware state data is one or more of low power, low-resolution image information, audio data, signals or commands, or position data or measurements.

The method 700 includes automatically determining 730 a content capture opportunity from the aware state data. In an implementation, determining 730 the content capture opportunity may include analyzing the low power, low-resolution image information. The content capture opportunity may be based on, but is not limited to, scene classification, object classification, scene pattern, object pattern, and the like. For example, an analysis of the low-resolution image information may determine that a birthday party is going on, a user may be about to go surfing or ski jumping, that a ceremony is about to happen and the like. In an implementation, determining 730 the content capture opportunity may include analyzing the audio data, signals or commands. The content capture opportunity may be based on, but is not limited to, sound classification, command recognition, and the like. For example, an analysis of the audio data, signal, or command may determine a birthday party based on the audio data matching a rendition of a happy birthday song. For example, the audio command may match a known command to start capturing content. In an implementation, determining 730 the content capture opportunity may include analyzing the position data or measurements to determine if the image capture device is in a content capture position or about to be in a content capture position. In an implementation, determining 930 the content capture opportunity may include a combination thereof. If a content capture opportunity does not exist, continue to capture aware state data. In an implementation, the determining 730 may include starting to capture content with the image capture device including image information and audio data, signals, or commands.

The method 700 includes automatically selecting 740 an image capture device mode for the content capture opportunity. In an implementation, selection of the image capture device mode may be based on scene classification, object classification, scene pattern, object pattern, and the like based on the low power, low-resolution image information, image information from the image sensor, or both. In an implementation, the selection of the image capture device mode may be based on sound classification, command recognition, and the like based on the audio data, signals, or commands. In an implementation, selection of the image capture device mode may be based on one or more of scene classification, object classification, scene pattern, object pattern, sound classification, command recognition, and the like based on one or more of the low power, low-resolution image information or the audio data, signals, or commands.

The method 700 includes automatically capturing 750 content with the selected image capture device mode. In an implementation, image capture device uses an image sensor and other image capture device components to capture content using the selected image capture device mode. In an implementation, the capturing 750 may include updating selection of the image capture device mode based on scene classification, object classification, scene pattern, object pattern, and the like from image information, based on sound classification, command recognition, and the like based on audio data, signals or commands, or both. In an implementation, the capturing 750 may include stop capturing content based on user action, audio signal or command, image capture device position, scene and/or object determination, defined period, time period, event based, and the like.

FIG. 8 is flowchart of an example method 800 for instantly capturing content in accordance with embodiments of this disclosure. The method 800 includes: setting 810 an image capture device in an event mode; obtaining 820 position measurements; automatically determining 830 a content capture opportunity from the obtained measurements; automatically selecting 840 an image capture device mode for the content capture opportunity; and automatically capturing 850 content with the selected image capture device mode. The method may be implemented in any of the image capture devices described in FIGS. 1-6A-C.

The method 800 includes setting 810 an image capture device in an event mode. In the event mode, a position sensor may be turned on in advance of an upcoming event including, but not limited to, a birthday party, a graduation, a ski jump, dinner, and the like.

The method 800 includes obtaining 820 position measurement data. In an implementation, a position sensor obtains position measurement data on an on-going basis, a defined period, or a periodic basis once event mode has been entered.

The method 800 includes automatically determining 830 a content capture opportunity from the position measurement data. In an implementation, determining 830 the content capture opportunity may include analyzing the position data or measurements to determine if the image capture device is in a content capture position or about to be in a content capture position. If a content capture opportunity does not exist, continue to obtain position measurement data. In an implementation, the determining 830 includes starting to capture content with the image capture device including image information and audio data, signals, or commands. In an implementation, an image sensor and optical component are enabled to capture image information.

The method 800 includes automatically selecting 840 an image capture device mode for the content capture opportunity. In an implementation, selection of the image capture device mode may be based on scene classification, object classification, scene pattern, object pattern, and the like based on image information from an image sensor. In an implementation, the selection of the image capture device mode may be based on sound classification, command recognition, and the like based on audio data, signals, or commands. In an implementation, selection of the image capture device mode may be based on one or more of scene classification, object classification, scene pattern, object pattern, sound classification, command recognition, and the like based on one or more of the image information or the audio data, signals or commands.

The method 800 includes automatically capturing 850 content with the selected image capture device mode. In an implementation, image capture device uses an image sensor and other image capture device components to capture content using the selected image capture device mode. In an implementation, the capturing 840 may include updating selection of the image capture device mode based on scene classification, object classification, scene pattern, object pattern, and the like from image information, based on sound classification, command recognition, and the like based on audio data, signals, or commands, or both. In an implementation, the capturing 840 may include stop capturing content based on user action, audio signal or command, image capture device position, scene and/or object determination, defined period, time period, event based, and the like.

FIG. 9 is flowchart of an example method 900 for instantly capturing content in accordance with embodiments of this disclosure. The method 900 includes: enabling 910 one or more low power components; capturing 920 content; automatically matching 930 classification or pattern of the captured content; automatically selecting 940 an image capture device mode for matched captured content; and automatically capturing 950 content with the selected image capture device mode. The method may be implemented in any of the image capture devices described in FIGS. 1-6A-C.

The method 900 includes enabling 910 one or more low power components. In an implementation, a low power, low-resolution image sensor may be turned on. In an implementation, a low power, low-resolution image sensor may be periodically turned on. In an implementation, an audio component may be turned on. In an implementation, an audio component may be periodically turned on. In an implementation, one or more of the low power, low-resolution image sensor or the audio component may be turned on. In an implementation, one or more of the low power, low-resolution image sensor or the audio component may be periodically turned on.

The method 900 includes capturing 920 content. In an implementation, the content is low power, low-resolution image information. In an implementation, the content is audio data, signals or commands. In an implementation, the aware state data is one or more of low power, low-resolution image information or audio data, signals, or commands.

The method 900 includes automatically matching 930 classification or pattern of the captured content. In an implementation, determining 930 the content capture opportunity may include analyzing the low power, low-resolution image information. The content capture opportunity may be based on, but is not limited to, scene classification, object classification, scene pattern, object pattern, and the like. For example, an analysis of the low-resolution image information may determine that a birthday party is going on, a user may be about to go surfing or ski jumping, that a ceremony is about to happen and the like. In an implementation, determining 930 the content capture opportunity may include analyzing the audio data, signals or commands. The content capture opportunity may be based on, but is not limited to, sound classification, command recognition, and the like. For example, an analysis of the audio data, signal, or command may determine a birthday party based on the audio data matching a rendition of a happy birthday song. For example, the audio command may match a known command to start capturing content. In an implementation, determining 930 the content capture opportunity may include a combination thereof. If a match does not exist, continue to capture content. In an implementation, the matching 930 includes starting to capture content with the image capture device including image information and audio data, signals, or commands.

The method 900 includes automatically selecting 940 an image capture device mode for matched captured content. In an implementation, selection of the image capture device mode may be based on scene classification, object classification, scene pattern, object pattern, and the like based on the low power, low-resolution image information, image information from the image sensor, or both. In an implementation, the selection of the image capture device mode may be based on sound classification, command recognition, and the like based on the audio data, signals, or commands. In an implementation, selection of the image capture device mode may be based on one or more of scene classification, object classification, scene pattern, object pattern, sound classification, command recognition, and the like based on one or more of the low power, low-resolution image information or the audio data, signals, or commands.

The method 900 includes automatically capturing 950 content with the selected image capture device mode. In an implementation, the image capture device uses an image sensor and other image capture device components to capture content using the selected image capture device mode. In an implementation, the capturing 950 may include updating selection of the image capture device mode based on scene classification, object classification, scene pattern, object pattern, and the like from image information, based on sound classification, command recognition, and the like based on audio data, signals or commands, or both. In an implementation, the capturing 950 may include stop capturing content based on user action, audio signal or command, image capture device position, scene and/or object determination, defined period, time period, event based, and the like.

In general, an image capture device includes an aware device configured to capture aware data, an opportunity processor configured to automatically determine a content capture opportunity by processing the captured aware data, a processor, for a determined content capture opportunity, configured to automatically select an image capture device mode based on the processed captured aware data, and an image sensor and optical component configured to instantly capture image information using the selected image capture device mode. In an implementation, the aware device is enabled for at least one of a defined period and an event mode. In an implementation, the aware device is a low power, low-resolution image sensor configured to capture low-resolution image information and the aware data is the low-resolution image information, and the opportunity processor is a classifier configured to automatically classify the low-resolution image information. In an implementation, the classifier further includes at least one of a computer vision engine and a neural network device. In an implementation, the classifier further configured to automatically classify the image information, and the processor further configured to automatically update the image capture device mode based on the classified image information. In an implementation, the aware device is one or more audio components configured to capture audio data and the aware data is the audio data, the opportunity processor is a classifier configured to automatically classify the audio data, the processor, for the determined content capture opportunity, configured to enable the image sensor and optical component to capture the image information, the classifier configured to automatically classify the image information, and the processor configured to automatically select an image capture device mode based on at least one of the classified captured aware data and the classified image information. In an implementation, the classifier further configured to automatically classify the image information using a computer vision engine and a neural network device, and the processor further configured to automatically update the image capture device mode based on further classified image information. In an implementation, the aware device and the opportunity processor is a position sensor, and where the position sensor configured to obtain image capture device position data when in an event mode, wherein the aware data is the image capture device position data, and determine the content capture opportunity by determining when the image capture device is in at least a potential content capture position using the image capture device position data and the processor, for the determined content capture opportunity, configured to enable the image sensor and optical component to capture the image information, and automatically select an image capture device mode based on at least one of the processed captured aware data and classified image information. In an implementation, the classifier further configured to automatically classify the image information using at least one of a computer vision engine and a neural network device, the processor further configured to automatically update the image capture device mode based on further classified image information and the processor configured to automatically stop capturing the image information based on at least one of additional processed captured aware data and additional classified image information.

In general, a method for instantly capturing image information, the method including placing an image capture device in an aware state, automatically capturing aware state data, automatically determining whether a content capture opportunity exists based on the captured aware state data, automatically selecting an image capture device mode for a positive content capture opportunity, and automatically capturing content with the selected image capture device mode. In an implementation, low power content capture devices are enabled when in the aware state. In an implementation, a low power content capture device is a low power, low-resolution image sensor configured to capture low-resolution image information and the aware state data is the low-resolution image information, and the automatically determining further includes automatically classifying the low-resolution image information using at least one of a computer vision engine and a neural network device, and automatically selecting the image capture device mode based on the classified image information. In an implementation, the method further including automatically updating the image capture device mode based on further classified image information, and stopping capturing image information based on at least one of additional processed captured aware state data and additional classified image information. In an implementation, the image capture device is in an event mode when in the aware state, a position sensor is enabled to obtain measurement data for the image capture device, the aware state data is the measurement data, and the automatically determining further including automatically determining when the image capture device is approaching a content capture position using the measurement data, automatically capturing the image information when the approach is near or at the content capture position, automatically classifying the captured image information, and automatically selecting the image capture device mode based on the classified image information. In an implementation, automatically updating the image capture device mode based on further classified image information, and automatically stopping capturing image information based on at least one of additional processed captured aware state data and additional classified image information.

In general, a method for instantly capturing image information, the method including setting an image capture device in an event mode, automatically obtaining position data for the image capture device, automatically determining whether the image capture device is in a content capture position based on the obtained position data, automatically capturing image information when the image capture device is near or in the content capture position, automatically selecting an image capture device mode for the captured image information, and automatically capturing image information with the selected image capture device mode. In an implementation, the method including automatically classifying the captured image information. In an implementation, the method including automatically updating the image capture device mode based on further classified image information. In an implementation, the method including automatically stopping capturing image information based on at least position data. In an implementation, the method including automatically stopping capturing image information based on at least classified image information.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
an aware device configured to capture aware data;
an opportunity processor, in response to the captured aware data, configured to automatically determine a content capture opportunity by processing the captured aware data,
wherein the aware device and the opportunity processor are at least a position sensor, and the position sensor is configured to:
obtain image capture device position data when in an event mode, wherein the captured aware data includes the image capture device position data;
automatically determine when the image capture device is approaching the content capture opportunity using the image capture device position data; and
a processor, in response to the determined content capture opportunity, configured to:
enable an image sensor and optical component to capture image information when the image capture device is near or at the content capture opportunity;
automatically classify the captured image information; and
automatically select an image capture device mode based on the classified image information.

2. The image capture device of claim 1, wherein the aware device is enabled for at least one of a defined period and an event mode.

3. The image capture device of claim 1, wherein:
the aware device includes a low power, low-resolution image sensor configured to capture low-resolution image information and the aware data includes the low-resolution image information; and
the opportunity processor is a classifier configured to automatically classify the low-resolution image information.

4. The image capture device of claim 3, wherein the classifier further comprising at least one of a computer vision engine and a neural network device.

5. The image capture device of claim 1, wherein:
the aware device includes one or more audio components configured to capture audio data and the aware data is the audio data,
the opportunity processor is a classifier configured to automatically classify the captured audio data;
the processor, for the determined content capture opportunity based on the captured audio data, configured to enable the image sensor and optical component to capture the image information;
the classifier configured to automatically classify the image information; and
the processor configured to automatically select the image capture device mode based on at least one of the classified captured audio data and the classified image information.

6. The image capture device of claim 5, wherein:
the classifier further configured to automatically classify the image information using a computer vision engine and a neural network device; and
the processor further configured to automatically update the image capture device mode based on further classified image information.

7. The image capture device of claim 1, wherein:
the opportunity processor further configured to automatically classify the image information using at least one of a computer vision engine and a neural network device;
the processor further configured to automatically update the image capture device mode based on further classified image information; and
the processor configured to automatically stop capturing the image information based on at least one of additional processed captured aware data and additional classified image information.

8. A method for instantly capturing image information, the method comprising:
placing an image capture device in an aware state;
automatically capturing aware state data, wherein the aware state data includes measurement data captured by a position sensor, and in direct response to the measurement data:
automatically determining whether a content capture opportunity exists based on the captured aware state data, the automatically determining comprising:
automatically determining when the image capture device is approaching a content capture position using the measurement data; and
automatically capturing the image information when the image capture device is near or at the content capture position;
automatically classifying the captured image information;
automatically selecting an image capture device mode based on the classified image information; and
automatically capturing content with the selected image capture device mode.

9. The method of claim 8, wherein low power content capture devices are enabled when in the aware state.

10. The method of claim 9, wherein a low power content capture device is a low power, low-resolution image sensor configured to capture low-resolution image information and the aware state data is the low-resolution image information, and the automatically determining further comprising:
automatically classifying the low-resolution image information using at least one of a computer vision engine and a neural network device; and
automatically selecting the image capture device mode based on the classified image information.

11. The method of claim 10, further comprising:
automatically updating the image capture device mode based on further classified image information; and
stopping capturing image information based on at least one of additional processed captured aware state data and additional classified image information.

12. The method of claim 8, further comprising:
automatically updating the image capture device mode based on further classified image information; and
automatically stopping capturing image information based on at least one of additional processed captured aware state data and additional classified image information.

* * * * *